United States Patent Office 2,758,215
Patented Aug. 7, 1956

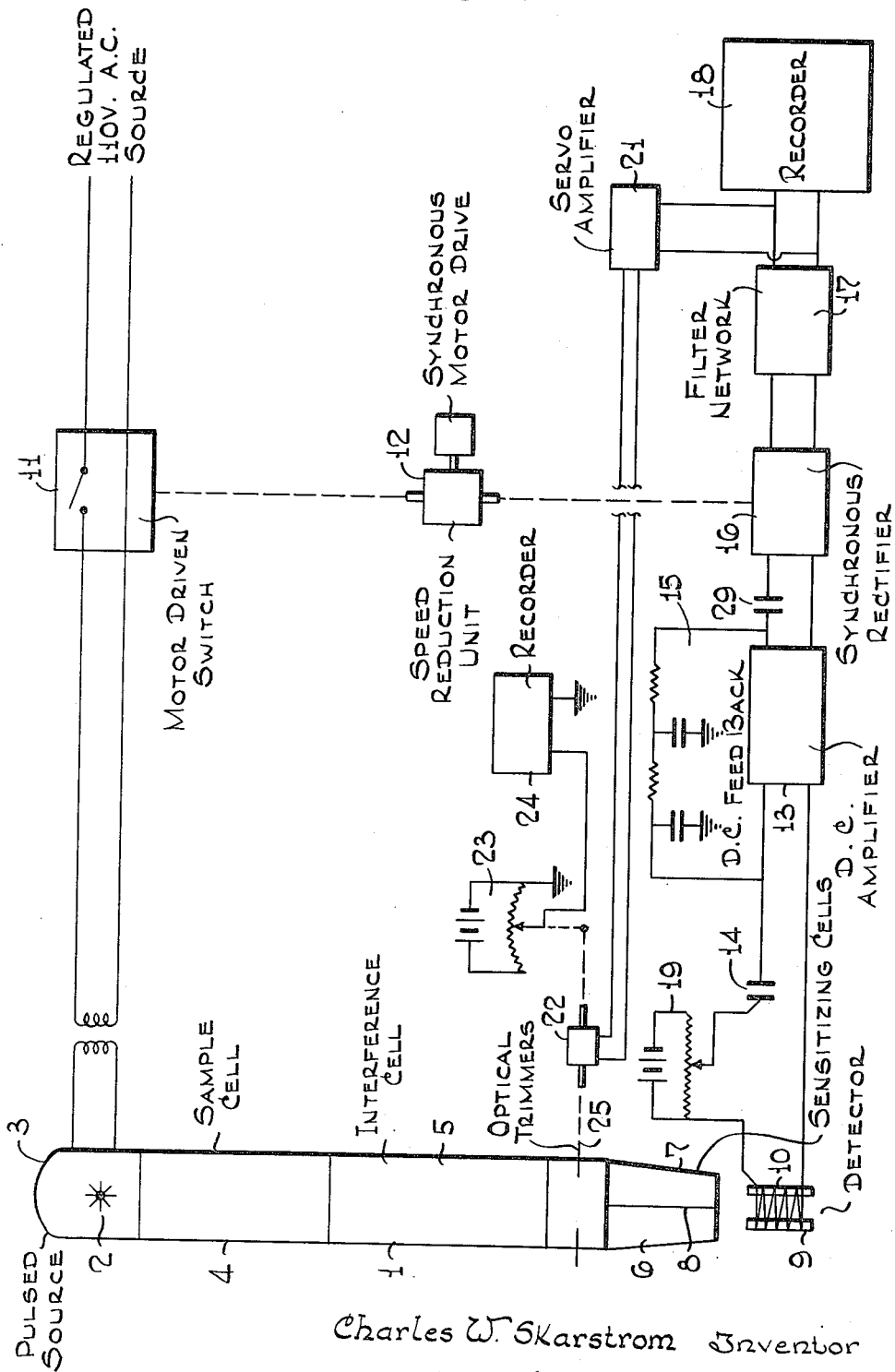

2,758,215

PULSED STABILIZED INFRA-RED DETECTION SYSTEM

Charles W. Skarstrom, Hazlet, N. J., assignor to Esso Research and Engineering Company, a corporation of Delaware Application August 31, 1951, Serial No. 244,533

5 Claims. (Cl. 250—43.5)

This invention concerns a novel method and apparatus for the stabilization of a detection system for infra-red energy. The invention is of application to apparatus in which the amount of energy transmitted from an infra-red source through absorption cells must be determined. In a specific embodiment, the invention concerns a novel infra-red analyzer of the dual beam type in which the energy from an infra-red source is formed into two beams transmitted through suitable optical cells to fall upon two infra-red detectors. The invention is characterized by a pulsating infra-red source resulting in transmission of pulsing infra-red energy to a detector system that is receptive to this pulsing signal. As will be brought out, pulsation of an infra-red source permits the achievement of many advantages in systems of this character and particularly provides a stability heretofore unobtainable.

An understanding of the invention can best be obtained by considering briefly the principles of infra-red spectrometry as applied to the infra-red gas analyzers in use at the present time. The usable infra-red portion of the electromagnetic spectrum extends from wave lengths of about 1 to 100 microns. It is a well-known fact that many chemical compounds, such as hydrocarbons, when subjected to infra-red radiation will absorb certain amounts of the radiation, each compound having a characteristic absorption spectrum. In other words, it may be said that these compounds are opaque in varying degrees to portions of the infra-red spectrum. It has further been found that the amount of energy absorbed by any one compound in a mixture of compounds is directly related to the concentration of that compound in the mixture. It can be seen then that this principle has a valuable and definite application as an analytical tool. The development of suitable instruments to utilize this principle, however, has been complicated by several major limitations. For example, it is difficult in the case of complex mixtures to determine exactly how much absorption is due to any one component in the mixture independent of varying quantities of other absorbing compounds. Furthermore, heat rays exist in the infra-red region of the spectrum so that any sources of heat in proximity to the instrument will have a deleterious effect on the results obtained. The main difficulties then in developing such an instrument lie in (1) sensitizing the instrument to a particular compound and (2) eliminating the effects of infra-red radiation generated in the immediate vicinity of the instrument.

Present day analyzers are in the main of two types: (1) the dispersion type, and (2) the non-dispersion type. The dispersion instrument takes infra-red radiation from a source, disperses it into narrow wave length bands, and passes it through the material to be analyzed to an infra-red energy detector. This instrument is based on the principle that a chemical compound absorbs a certain amount of radiation and transmits the remainder depending upon the wave length of radiation employed. If such absorption (or transmission) is plotted against wave length for the entire infra-red range, a characteristic curve is obtained. Every infra-red absorbent compound in general has a specific absorption spectrum, thereby providing an excellent means for identifying and measuring the amount of each one.

The non-dispersion instrument passes the total infra-red radiation from a source through the material to be analyzed and measures the amount of the total energy absorbed relative to a known reference value. In general, this instrument is used to determine the amount of one component present in a mixture. The instrument may be made selective for any desired compound by employing suitable cells containing selected compositions which are located in the range of radiation.

In either the dispersion or non-dispersion instrument, it has been found valuable, at some stage in the optical system, to split the infra-red radiation into two beams. These two beams are then impinged on two radiation detectors, generally connected in opposition. The present invention is of particular application to such dual beam systems in non-dispersion analyzers.

Thus in a non-dispersion instrument, infra-red energy from a suitable source may be split into two beams, both of which are passed through an optical cell which contains the sample to be analyzed. One beam is then directed through a filter cell containing a mixture of compounds, which act as optical filters and sensitize the instrument for a selected component. The other beam traverses a compensator cell which likewise contains a mixture of compounds. Each beam is then focused upon separate infra-red detectors which are connected in an electrical bridge network.

Any change in the composition of the sample, for which the instrument is sensitized, causes a difference in the amount of radiation falling upon the two detectors, because of the differential infra-red absorption of the mixtures in the filter and compensator cells. The differential temperature change between the two detectors produces an electrical signal which is amplified and suitably measured. The magnitude of this signal is necessarily very small. It is essential therefore that such an instrument operate within very narrow electrical and optical noise limits, and that large variations in ambient temperature be carefully avoided. Again, proximity of warm bodies to the apparatus and spurious signals developed in the detector system due to E. M. F.'s generated by electrical junctions are among the sources of error. Any infra-red energy that may be transmitted to the walls of the optical cells or generated by these walls may effectively change the analytical results. The detector thus sees differences in radiation from the walls of the optical cells as well as differences in radiation caused by the opacity of the compounds placed in the optical cells.

In the actual operation of the presently used non-dispersion infra-red analyzers, additional limitations are encountered. For example, it generally requires a long time to obtain equilibrium conditions. It is also important that the instrument be kept in optical balance, and that the optical balance point remain unaffected by changes in the temperature of the source and changes in the composition of the material being analyzed.

An instrument of this type is in optical balance only when the two detectors, connected in opposition as they are, produce electrical signals that cancel each other when the sample of material being analyzed does not contain any of the particular component desired to be measured. By way of illustration, this condition of optical balance is obtained for the analysis of one component in a mixture of gases by inserting various opaque gases or adjustable opaque plates called "trimmers" in one or both of the optical paths. The actual procedure of bringing an instrument into optical balance is well known in the art and therefore will not be discussed at length here. It is important to note, however, that the optical balance point of such an instrument must not fluctuate or drift; otherwise, the accuracy of the instrument is greatly lessened.

In the presently used non-dispersion instruments which employ non-pulsating sources, it is virtually impossible to maintain a fixed optical balance point for a given analysis. This shortcoming has been found to be due largely to the fact that no two detectors will develop identical electrical voltages when the infra-red energy impinging upon them varies in intensity. In the language of the art, this condition is described by saying that the detectors do not "track" alike.

In the present invention, this non-tracking of the detectors has been eliminated by the use of a pulsing source. The portion of the instrument which actually measures the signal generated by the detectors is designed to receive and determine the amplitude of only the pulsating D. C. electrical signal generated by the detectors, thereby eliminating errors caused by undesired infra-red radiation and spurious electrical signals described above. A further attribute of the present invention lies in the fact that this type of an instrument reaches equilibrium conditions very rapidly and is exceptionally stable.

In accordance with this invention, a highly stable dual beam infra-red analyzer which is largely immune to the sources of error described above is obtained by causing the infra-red source to pulse at a low frequency. The pulsing is created by alternately energizing and de-energizing the source. As a result, the detector system develops a pulsating D. C. electrical signal which is superimposed upon a slowly drifting D. C. signal. The former signal is due solely to the energy received by the detectors from the source, whereas the latter signal is the net result of the many sources of error otherwise present. By selectively amplifying only the pulsating portion of the overall signal generated by the infra-red detector, it has been found possible to obtain analytical results of great accuracy and reproduceability.

It should be observed that the benefits of this principle as applied in the present invention can not be obtained by what might appear to be equivalent methods of operation. For example, it is not practical to employ a shutter arrangement positioned in front of the infra-red source, thereby alternately exposing and covering the source to achieve the desired objectives. If a shutter were to be used to pulse the infra-red energy, it would be found that the shutter would function as a radiator and thus would introduce the very type of error desired to be eliminated.

It has been found critical to employ a particular pulsing frequency in order to obtain the desired results. In general, it is possible to employ pulsing infra-red sources in which the source is operative for about $\frac{1}{10}$ of a second and inoperative for the next $\frac{1}{10}$ of a second, or sources may be employed having a longer pulsing period so that the source may be on for about 100 seconds and off every alternate 100 seconds. A suitable pulsing frequency is therefore about $\frac{1}{200}$ of a cycle per second to about 5 cycles per second. It has been found that if faster pulsing frequencies are employed, sufficient time is not permitted for the detector to heat up and cool down sufficiently fast. Alternatively, if a slower frequency is employed, it is not possible to eliminate sources of radiation error which could occur in the resultingly long pulsating period.

Any suitable method of causing the periodic operation of the infra-red source may be employed. For example, a simple and effective manner of controlling the cyclic operation of the source is to position a motor-driven switch in the electrical supply circuit to the infra-red source. The switch may be in the nature of a commutator, driven by a constant speed motor so that the source may be turned on and off for the desired periods of time. As will be developed, this method of controlling pulsing of the infra-red source is particularly desirable since it permits synchronization of the detection system of the apparatus. It should be observed that complete inactivation at the source is not required during "off" periods. The benefits of the invention may be obtained by periodically cutting the intensity of the source appreciably; for example, by dropping the voltage applied to the source.

The invention may be applied to any desired type of infra-red energy source, although it is preferred that the source be characterized by a relatively low heat capacity. This requirement permits rapid heating of the source so that the source can attain full temperature in the pulsing time selected.

Again any desired type of infra-red detector may be employed provided the detector be of the nature which provides an electrical voltage in response to the impingement of infra-red energy on the detector. Examples of such detectors are resistance thermometers, thermopiles, bolometers, thermistors, thermocouples, and photo conductive type cells. These detectors may be designated as infra-red transducers, capable of converting impinging infra-red radiation to an electrical signal. It is important that the detector have a low heat capacity to fulfill the important limitation that the detector can cool down faster than the source.

The remaining portion of this system includes a suitable electronic system whose function it is to selectively receive and amplify only the pulsating portion of the E. M. F. developed in the detector circuit.

In order to fully describe this invention, reference will be made to a specific embodiment of the invention which is diagrammatically illustrated in the accompanying drawing. This drawing shows the present invention as applied to an infra-red analyzer of the dual beam type. Referring to the drawing, the analyzer itself is designated by the numeral 1. The analyzer comprises a source of infra-red energy 2, which is preferably backed by reflecting mirrors 3, adapted to direct the infra-red energy linearly away from the source 2 through the optical cells illustrated. Thus, a sample cell 4 may be positioned in the range of radiation followed by what is generally called an interference cell 5. After passage of the radiation through the sample cell 4 and interference cell 5, radiation is transmitted through a pair of cells 6 and 7 which, as illustrated, may appear as a truncated cone divided by a partition 8. Essentially then, it may be considered that radiation from the source 2 is divided into two beams, one of which passes through cells 4, 5 and 6, and the other of which passes through cells 4, 5 and 7. By positioning two detectors 9 and 10 just beyond each of the cells 6 and 7, it is then possible to detect differences in the amount of radiation in each of these two beams.

In actual practice, cell 4, identified as the sample cell, is filled with a sample of the gas to be analyzed which, for example, may constitute a complicated mixture of hydrocarbon gases. One of the cells 6 or 7 is ordinarily filled with a pure sample of the constituent to be determined in the mixture of gases placed in the sample cell. The other of the two cells 6 and 7 may in some cases be empty or in other cases may be filled with one or more gases selected to improve the sensitivity of the analytical results. Particularly in the case in which a complicated mixture of hydrocarbons is analyzed, it is desirable to fill interference cell 5 with one or more of the constituents of the hydrocarbon mixture other than the constituent to be determined. Since all hydrocarbons are infra-red absorbent to some degree, these gases may be considered interfering gases. The selectivity of the analytical results may be greatly improved by placing one or more of the interfering gases in the interference cell. It has particularly been found in the conventional operation of an infra-red analyzer of this type that when the sample is a mixture of hydrocarbon gases, the selectivity as to one component may be substantially improved by employing an interference cell composition of sufficient opacity to reduce the transmitted infra-red energy to a barely detectable point. It has been found desirable to employ this principle to such an extent that it is difficult to obtain a detectable amount of infra-red energy at the detector end of the apparatus. It is a particular feature of this invention that the exceedingly small signals which are developed in this case may successfully be detected.

In applying the present invention to the type of analyzer illustrated, the infra-red source 2 is caused to operate in a periodic manner by mechanically breaking the heating circuit as by means of the motor-driven switch 11. Thus, by driving commutator switch 11 at a suitable speed by means of the synchronous motor drive 12, the electrical heating circuit illustrated will be made and broken so as to secure the intermittent operation of the infra-red source.

The two detectors 9 and 10 are connected in opposition and the opposed output of these detectors is impressed on a suitable D. C. amplifier. The D. C. amplifier illustrated may be of the character in which a mechanical commutator is employed to develop an A. C. voltage proportional in magnitude to the D. C. input. This A. C. voltage is then amplified in a conventional A. C. amplifier. Thereafter a mechanical commutation device may again be employed to convert the amplified A. C. voltage to a D. C. voltage which may be suitably filtered for detection as a pure D. C. output. It is preferred that a large capacitance condenser 14 be positioned in the input circuit of the amplifier. This capacitance provides the important function of preventing passage of high D. C. level outputs from the detectors to the D. C. amplifiers. Thus the detectors may have a relatively large static D. C. potential due to thermal E. M. F.'s continuously developed. Capacitor 14 serves to prevent passage of such non-pulsating D. C. voltage to the amplifier. It is particularly desirable to have the capacitor be of such size that the impedance of the capacitor at the pulsing frequency is of the same order of magnitude as the impedance of the infra-red detectors.

It is also advantageous to maintain a D. C. grid bias on capacitor 14 by employing a potentiometer circuit 19. The movable arm of the potentiometer is positioned such that a D. C. voltage larger than any D. C. voltage normally expected is continuously exerted. This superimposed D. C. voltage serves two functions: (1) it keeps the polarity of the detector the same at all times, and (2) it maintains the capacity of capacitor 14 at a fixed value. The amount of D. C. voltage that can be thus imposed is limited by the extent to which the feed back circuit 15 described below can effectively cancel the leakage currents caused by it.

A resistance capacitance net-work 15 is preferably coupled to the output of the D. C. amplifier providing a feed back loop to the input of the D. C. amplifier. This RC network is chosen to have a long time constant so that any D. C. voltage appearing on the output of the amplifier will be fed back to the system. Effectively, the network 15 serves to segregate the D. C. component from the A. C. component of the amplifier output. The A. C. component is passed through coupling condenser 29 to a suitable rectifier 16 while the D. C. component is prevented by condenser 29 from reaching this portion of the system. The rectifier 16 may consist of a mechanical commutator phased with switch 11 to provide a D. C. output proportional in magnitude to the A. C. input supplied to the rectifier and corresponding in sense to whichever of the detectors 9 or 10 provides more signal. The desired synchronization of the rectifier 16 with switch 11 or the pulsating infra-red source, may be readily achieved by coupling the rectifier to the motor drive 12 which drives the switch 11 controlling the pulsations of the infra-red source. The rectifier may be used to follow the E. M. F. generated by the detectors through the entire pulsing cycle or any portion of it.

The output of the rectifier is then passed through a suitable filter network so that the rectified pulsating D. C. signal may be converted to a non-pulsating D. C. voltage. This final D. C. voltage output may then be suitably indicated as by means of a vacuum type voltmeter or other D. C. indicator, or recorded on recorder 18. The magnitude of the D. C. voltage output will be proportional to the differential voltage of detectors 9 and 10, while the sense, plus or minus, will indicate which detector is developing the greater signal.

This instrument can be adapted to analyze solid, liquid or gaseous samples either spotwise or continuously. Again, if desired, the signal output of the instrument by proper instrumentation may be employed to control automatically the reaction conditions or reactant concentrations in a given process. In this connection, it may be desirable in some instances to use more than one instrument to control simultaneously several conditions or the concentrations of several materials in a process.

An alternative method of utilizing the D. C. output signal of the filter network 17 consists in feeding it to a servo amplifier 21 which drives a servomotor 22. The servomotor, in turn, can then be used to perform two functions. First, it can be used to automatically adjust the position of the optical trimmer 25 in one of the infra-red radiation beams in response to the differential signals emitted by the detector as a result of optical unbalance created in the spectrometer due to changes in the composition of the sample. This servo mechanism, therefore, can be employed to operate the detection portion of the spectrometer as a null system. In other words, the spectrometer can be made to generate a zero signal at all times by continuously and automatically positioning one of the trimmers to maintain the instrument in optical balance. It is apparent then that the linear change in the position of the trimmer would be a direct function of the composition of the sample of material in the sample cell of the spectrometer. The movement of the trimmer could be quantitatively determined by a variety of means. For example, the shaft of the servomotor 22 can be made to drive the moving arm of a potentiometer circuit 23 which in turn can be used to supply a signal to a recorder 24. It is readily apparent that the magnitude of this signal is a direct function of the movement of the optical trimmer, and therefore also a direct function of the composition of the material being present in the sample cell of the instrument. It follows, therefore, that the second function that the servomotor can be made to perform is that of driving an instrument to indicate or record the analysis of a material by means of this instrument.

The use of a null system as described above has the very desirable property of minimizing any effects on the results of the instrument that might be caused by variations in the gain of the electronic amplifiers or in the voltage of the power mains.

A variety of methods can be used to operate this instrument with a nulled detection system. As another example, a servomotor such as the one described above can be employed to operate a voltage control on an auxiliary infra-red source placed in one of the beams. As the instrument went out of optical balance, the detector signal thus generated would operate the servomotor which in turn would change the energy emitted from the auxiliary infra-red source, thus restoring the condition of optical balance.

Having now fully disclosed the nature of this invention, what is claimed is:

1. Apparatus for detecting pulsing infra-red radiation comprising in combination two infra-red transducers hooked up in electrical opposition, responsive to the pulses of infra-red radiation impinging upon them and adapted to convert said pulses of radiation into a pulsing differential D. C. signal, electric circuit means for conducting the pulsing differential D. C. signal to a D. C. amplifier, a capacitance positioned in said electrical circuit means to prevent passage of non-pulsating D. C., said capacitance having an impedance value about equal to that of said transducer at the particular pulsing frequency employed, a potentiometer circuit to maintain a D. C. grid bias on said capacitance, second electrical circuit means for conducting the output signal of said D. C. amplifier to a rectifier, a capacitance and resistance circuit positioned in said second electrical circuit to feed non-pulsating D. C. signals in the output of the D. C. amplifier back to the input of said amplifier, a filter network to convert the pulsing D. C. signal from the rectifier to a non-pulsing D. C. signal, and a means for indicating the amplitude of said non-pulsing D. C. signal issuing from the filter network.

2. In a dual beam infra-red apparatus consisting of a source, a sample cell, an interference cell, an optical trimmer and a sensitizing cell in each beam of radiant infra-red energy, the improvement which comprises, in combination, means for periodically and cyclically energizing said source from one energy level to a second energy level so as to emit pulses of infra-red radiation at frequencies of about $\frac{1}{200}$ to 5 cycles per second, a thermopile positioned in each beam after passage through the optical cells capable of converting the pulses of infra-red energy into a pulsating D. C. signal, said two thermopiles being connected in electrical opposition to produce a differential pulsating D. C. signal, electric circuit means for conducting the pulsating differential D. C. signal to a D. C. amplifier, a capacitance positioned in the electrical circuit to prevent passage of non-pulsating D. C. signals, said capacitance having an impedance value about equal to that of the thermopiles at the particular pulsing frequency employed, a potentiometer circuit to maintain a D. C. grid bias on said capacitance, second electrical circuit means for conducting the output signal of the D. C. amplifier to a rectifier, a capacitance and resistance circuit positioned in said second electrical circuit to feed non-pulsating D. C. signals in the output of the D. C. amplifier back to the input of said amplifier, means for synchronizing the operation of the rectifier with the pulsing of said infra-red source, a filter network to convert the pulsing D. C. signal from the rectifier to a non-pulsating D. C. signal, and a means for indicating the amplitude of said non-pulsating D. C. signal issuing from the filter network.

3. In a dual beam infra-red apparatus consisting of a source, a sample cell, an interference cell, an optical trimmer and a sensitizing cell in each beam of radiant infra-red energy, the improvement which comprises, in combination, means for periodically and cyclically energizing said source from one energy level to a second and substantially different energy level so as to emit pulses of infra-red radiation at frequencies of about $\frac{1}{200}$ to 5 cycles per second, a thermopile positioned in each beam after passage through the optical cells capable of converting the pulses of infra-red energy into a pulsating D. C. signal, said two thermopiles being connected in electrical opposition to produce a differential pulsating D. C. signal, electric circuit means for conducting the pulsating differential D. C. signal to a D. C. amplifier, a capacitance positioned in the electrical circuit to prevent passage of non-pulsating D. C. signals, said capacitance having an impedance value about equal to that of the thermopiles at the particular pulsing frequency employed, a potentiometer circuit to maintain a D. C. grid bias on said capacitance, second electrical circuit means for conducting the output of the D. C. amplifier to a rectifier, a capacitance and resistance circuit positioned in said second electrical circuit to feed non-pulsating D. C. signals in the output of the D. C. amplifier back to the input of said amplifier, means for synchronizing the operation of the rectifier with the pulsing of said infra-red source, a filter network to convert the pulsating D. C. signal from the rectifier to a non-pulsating D. C. signal, third electrical circuit means for transmitting said non-pulsating D. C. signal from the filter network to a servo-amplifier, a servomotor driven by the output signal of said servo-amplifier, said servo-motor serving to change the position of one of said optical trimmers in one of said beams of infra-red energy so as to maintain said spectrometer in optical balance, and means for indicating the change in position of said optical trimmer.

4. In a dual beam infra-red apparatus consisting of a source, a plurality of optical cells, an optical trimmer and an infra-red transducer in each beam, the improvement which comprises, in combination, means for cyclically and continuously varying the amount of energy radiating from said source between two energy levels so as to emit pulses of infra-red energy, means for amplifying and segregating the differential pulsing signal generated by said two transducers in response to the beams of infra-red energy impinging upon them, means for converting the amplified pulsing signal to a non-pulsing signal varying in magnitude in proportion to the magnitude of said amplified pulsing signal, a servo mechanism operating in response to the non-pulsing signal to position one of said optical trimmers in one of said beams of radiation so as to maintain said spectrometer in optical balance, and means for indicating the change in position of said optical trimmer.

5. Apparatus as described in claim 4 in which the amount of energy radiating from the infra-red source is cyclically and continuously varied in cycles of $\frac{1}{5}$ to 200 seconds' duration.

References Cited in the file of this patent

UNITED STATES PATENTS

| 2,376,311 | Hood | May 15, 1945 |
|---|---|---|
| 2,422,766 | Alexander | June 24, 1947 |
| 2,451,572 | Moore | Oct. 19, 1948 |
| 2,525,445 | Canada | Oct. 10, 1950 |
| 2,547,212 | Jamison et al. | Apr. 3, 1951 |
| 2,559,688 | Touvet | July 10, 1951 |
| 2,607,899 | Cary et al. | Aug. 19, 1952 |
| 2,640,389 | Liston | June 2, 1953 |
| 2,668,243 | Williams | Feb. 2, 1954 |